United States Patent [19]
Lin

[11] Patent Number: 6,038,923
[45] Date of Patent: Mar. 21, 2000

[54] HAND-OPERATED ACCELERATOR DEVICE FOR AN ELECTRIC-POWERED BICYCLE

[75] Inventor: Ming-Shyang Lin, Taichung Hsien, Taiwan

[73] Assignee: Giant Manufacturing Co., Ltd., Taichung Hsien, Taiwan

[21] Appl. No.: 09/085,467

[22] Filed: May 27, 1998

[51] Int. Cl.[7] ............................ G01P 15/00; B60K 41/00
[52] U.S. Cl. ........................... 73/488; 73/493; 73/DIG. 3; 180/167; 180/170
[58] Field of Search .................. 73/488, 493, 432.1, 73/DIG. 3; 180/167, 170, 171, 220, 221, 222, 230; 74/502.2; 324/207.2, 207.25, 160, 162

[56] References Cited

U.S. PATENT DOCUMENTS

| | | | |
|---|---|---|---|
| 5,307,706 | 5/1994 | Nagano | 74/502.2 |
| 5,395,293 | 3/1995 | Matsuura et al. | 477/15 |
| 5,433,284 | 7/1995 | Chou | 180/205 |
| 5,581,136 | 12/1996 | Li | 310/67 R |
| 5,816,355 | 10/1998 | Battlogg et al. | 180/221 |
| 5,855,410 | 1/1999 | Lin | 297/215.15 |

*Primary Examiner*—Hezron Williams
*Assistant Examiner*—Helen C. Kwok
*Attorney, Agent, or Firm*—Merchant & Gould P.C.

[57] ABSTRACT

A hand-operated accelerator device includes a handgrip speed controlling actuator sleeved rotatably on a handlebar. A speed controlling signal emitting member has an elongated chamber therein with an opened guiding slot. A shifting member is slidably received in the elongated chamber, and has two magnets spaced apart from each other, and a protruding member extending outwardly of the guiding slot to move the shifting member in the chamber upon rotation of the actuator. A hall-effect generator extends transversely between the magnets so as to generate a voltage signal to be received by a circuit board when the shifting member is moved in order to convert the voltage signal into a control signal for controlling revolutions of an electric drive mechanism of an electric-powered bicycle. A spring is disposed to bias the shifting member in a longitudinal direction.

6 Claims, 5 Drawing Sheets

6,038,923

HAND-OPERATED ACCELERATOR DEVICE FOR AN ELECTRIC-POWERED BICYCLE

BACKGROUND OF THE INVENTION

1. Field of the Invention

This invention relates to a hand-operated accelerator device for an electric-powered bicycle, more particularly to an accelerator device with a movable shifting member and a hall-effect generator for sending out different voltage signals when the shifting member is moved.

2. Description of the Related Art

Most electric-powered bicycles have hand-operated accelerators to control revolutions of the electric drive mechanisms. The conventional accelerator has a cable interconnecting an electric potential member, such as a variable resistor, and a handgrip. The rotation of the handgrip pulls the electric potential member so as to change its electric resistance for controlling the power of the drive mechanism. It is complicated to assemble the cable in the conventional accelerator. In addition, the cable tends to break down at its two connecting ends when pulled. The need to check carefully the break down position of the cable in the handgrip or the drive mechanism for repairing and replacement results in inconvenience during maintenance.

SUMMARY OF THE INVENTION

The object of the present invention is to provide a hand-operated accelerator device for use in an electric-powered bicycle which can minimize break down and which can operate steadily.

According to this invention, a hand-operated accelerator device includes a handgrip speed controlling actuator sleeved rotatably on a handlebar and having an outer circumferential seat. A speed controlling signal emitting member defines an elongated chamber extending in a longitudinal direction, and has an opened guiding slot. A shifting member is slidably received in the elongated chamber, and has two magnets spaced apart from each other with an accommodating space, and a protruding member extending outwardly so as to move the shifting member in the longitudinal direction upon rotation of the seat. A hall-effect generator extends transversely into the accommodating space so as to generate a voltage signal to be received by a circuit board when the shifting member is moved. The circuit board converts the voltage signal into a control signal for controlling revolutions of an electric drive mechanism of an electric-powered bicycle. A spring is disposed to bias the shifting member in the longitudinal direction.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
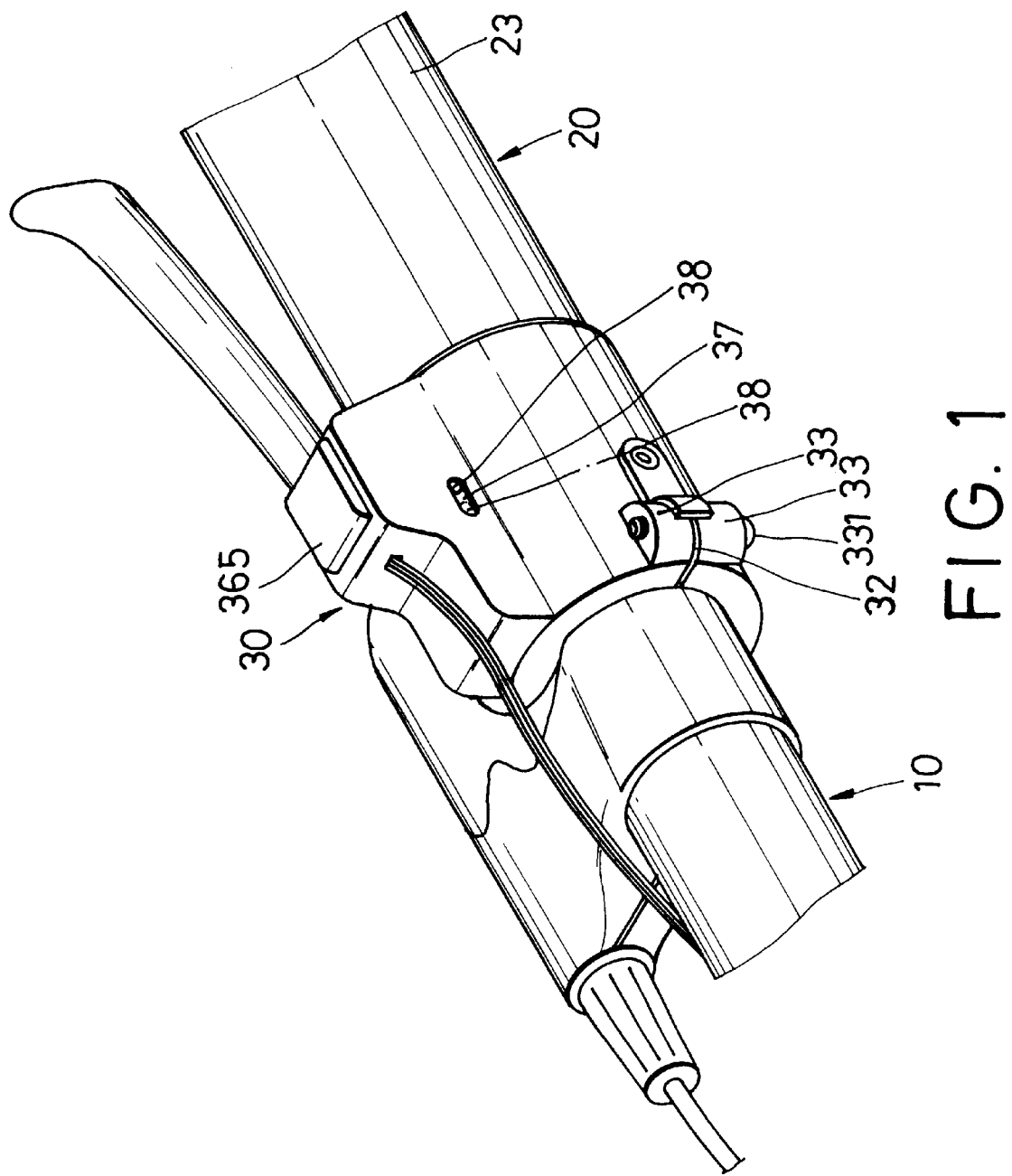
FIG. 1 is a perspective view of a preferred embodiment of an accelerator device according to this invention.
Figure 2:
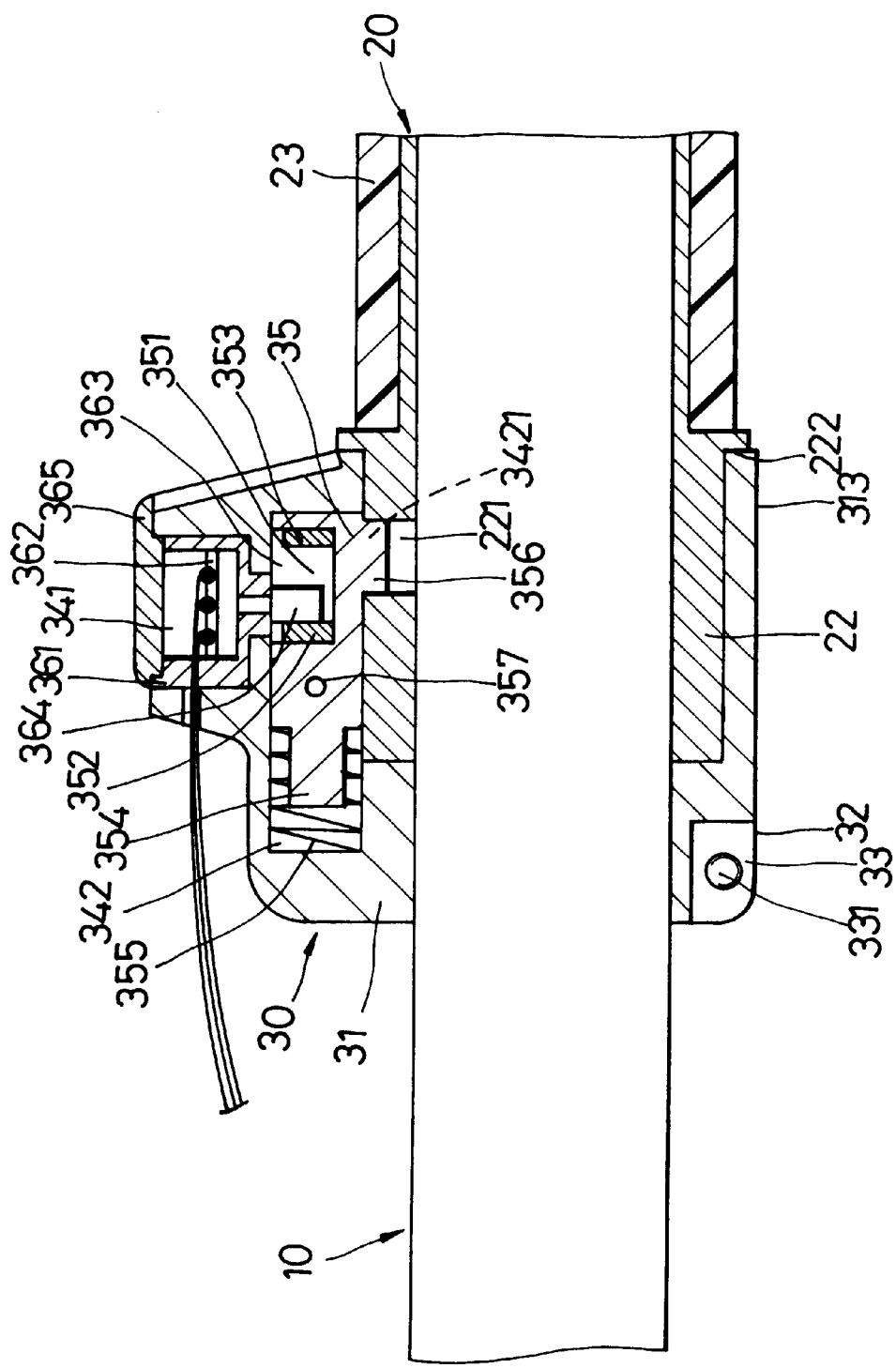
FIG. 2 is a sectional view of the preferred embodiment.

Referring to FIGS. 1 and 2, the preferred embodiment of a hand-operated accelerator device according to the present invention is shown to be mounted on a handlebar 10 of an electric-powered bicycle, and includes a handgrip speed controlling actuator 20, a speed controlling signal emitting member 30, and a shifting member 35.

The handgrip speed controlling actuator 20 is sleeved rotatably on the handlebar 10 and has a right end handgrip portion at a distal end of the handlebar 10, and a left end portion with an outer circumferential seat 22 which is sleeved on the handlebar 10 to rotate relative thereto. The seat 22 is formed with an annular shoulder 222 on its outer peripheral wall, and a keyway 221 that serves as a cam surface. The keyway 221 extends in a direction that is inclined relative to the longitudinal direction of the seat 22 (see FIG. 4). A handgrip 23 is provided to rotate the seat 22.

The emitting member 30 includes a body 31 made of aluminum, and has two lugs 33 with a slit 32 formed therebetween to facilitate sleeving of the body 31 on the handlebar 10. A fastener 331 passes threadedly through the lugs 33 to secure the body 31 on the handlebar 10. An end wall 313 of the body 31 abuts against the shoulder 222 of the seat 22. The body 31 defines an upper chamber 341 to mount a case 361 contains a circuit board 362 therein, and a lower elongated chamber 342 that is communicated with the upper chamber 341 and that extends in the longitudinal direction. A top cover 365 is mounted on the case 361. The elongated chamber 342 has a guiding slot 341 that is opened externally to communicate with the keyway 221.

The shifting member 35 is received in the elongated chamber 342, and has a recess 363 in its upper end to receive two magnets 352,353 which are spaced apart from each other with an accommodating space 351. A tubular post 354 projects from a left side of the shifting member 35, and has a spring 355 sleeved thereon. The spring 355 has two ends abutting against the shifting member 35 and an inner wall of the elongated chamber 342. The shifting member 35 further has a protruding member 356 extending outwardly of the guiding slot 341 into the keyway 221 so as to slide in the keyway 221 when the seat 22 is rotated, thereby moving the shifting member 35 within the elongated chamber 342 in the longitudinal direction. In addition, the shifting member 35 has an insert hole 357 at its intermediate portion.

A hall-effect generator 364 is connected electrically to the circuit board 362 and is disposed to extend transversely into the accommodating space 351. In this embodiment, the hall-effect generator 364 is a hall-effect integrated circuit. Movement of the shifting member 35 causes movement of the generator 364 relative to the magnets 352,353 so as to change the magnetic field strength due to the magnets 352,353, thereby enabling the generator 364 to generate a corresponding voltage signal.

The emitting member 30 further has an engaging hole 37 opposite to the insert hole 357, and a limit shaft 38 (see FIG. 1) inserted into the insert and engaging holes 357,37 in order to limit the movement of the shifting member 35.

Figure 3:
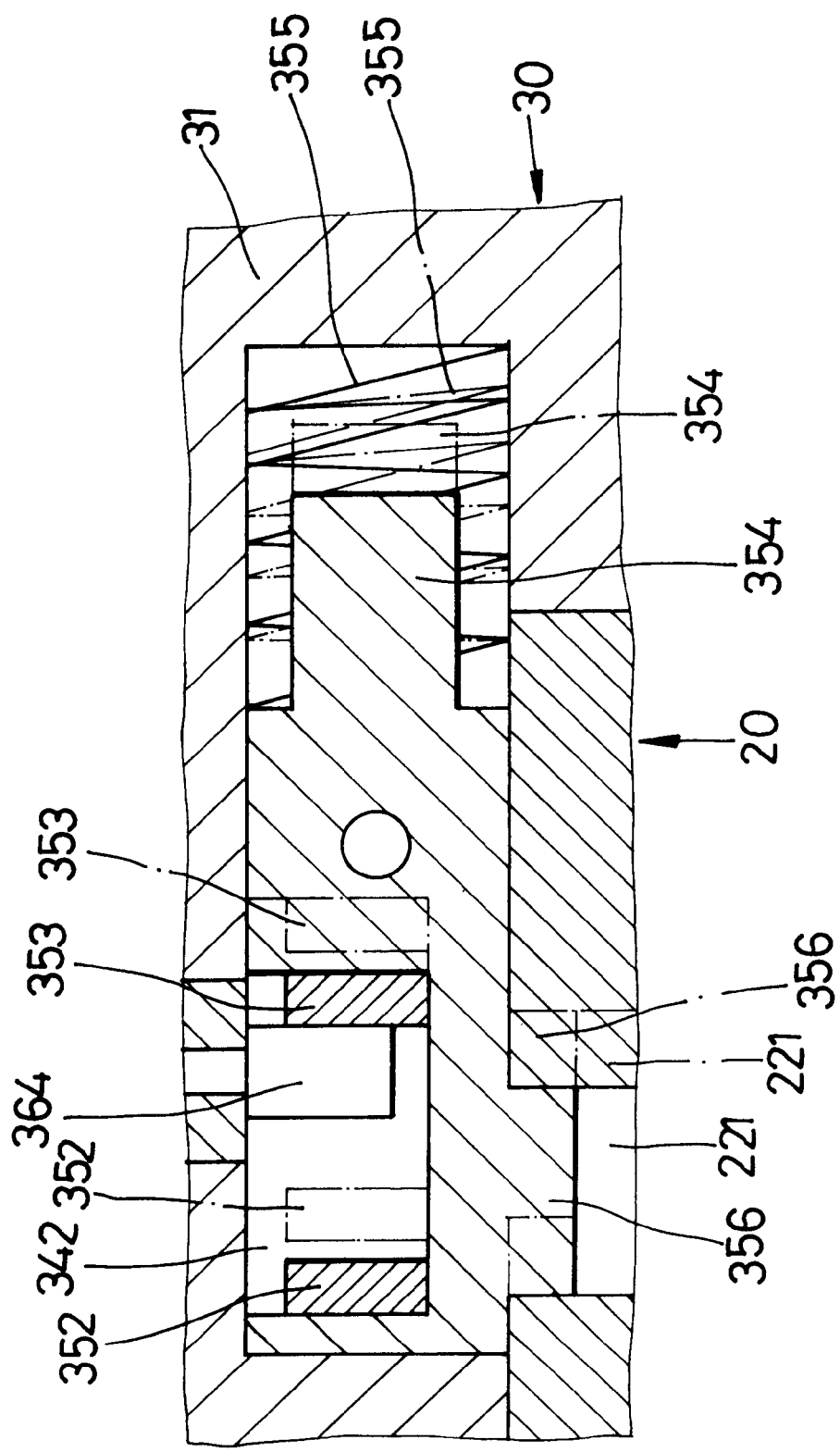
FIG. 3 is a sectional view of a portion of the preferred embodiment showing the movement of a shifting member.
Figure 4:
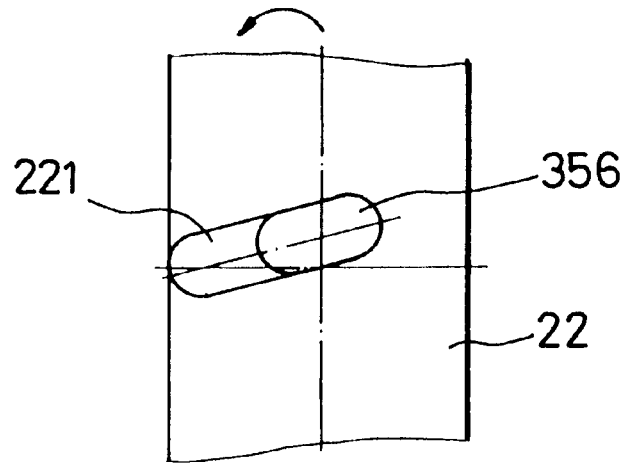
FIG. 4 is a schematic view showing the position of a protruding member of the shifting member relative to a keyway before being moved.
Figure 5:
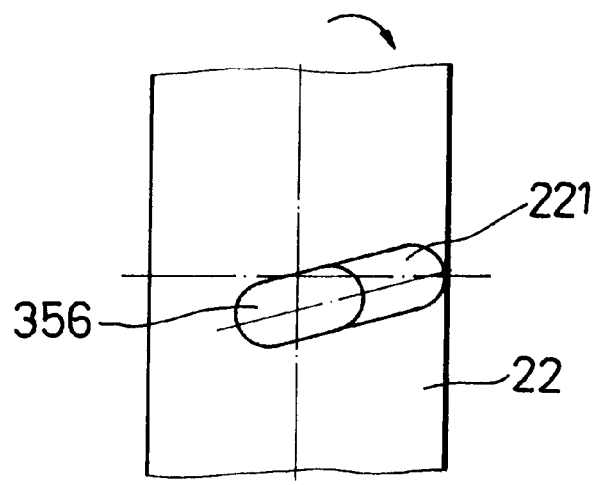
FIG. 5 is a schematic view similar to FIG. 4 after movement of the shifting member.
Figure 6:
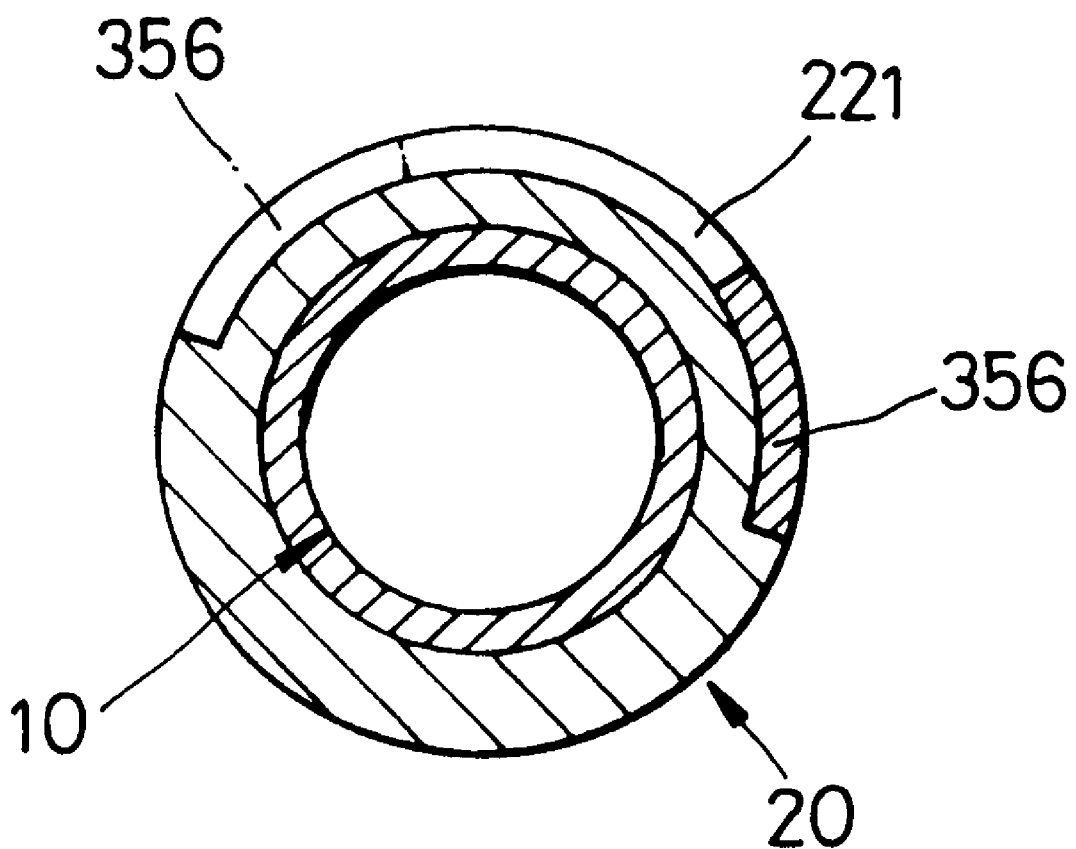
FIG. 6 is a transverse sectional view of another portion of the preferred embodiment.

In operation, with reference to FIGS. 2 and 3, the actuator 20, which is made of plastic, can be rotated smoothly on the handlebar 10, which is made of metal. FIG. 4 shows the position of the protruding member 356 in the right end of the keyway 221 before operation. Clockwise rotation of the handgrip 23 can rotate the seat 22 to move the keyway 221 upward so as to press the protruding member 356 toward the left end of the keyway 221, as shown in FIGS. 5 and 6. At the same time, referring again to FIG. 3, the shifting member 35 is moved and presses the spring 355, and the limit shaft 38 is moved within the engaging hole 37 from the right side toward the left side (see FIG. 1). As such, the position of the generator 364 relative to the magnets 352,353 is changed to generate the corresponding voltage signal that is provided to the circuit board 362 and that is converted into a control signal for controlling the revolutions of an electric drive mechanism (not shown) of the bicycle to drive a sprocket wheel (not shown) and accelerate the bicycle.

It is noted that the spring 355 can provide a buffer effect to prevent the sudden movement of the shifting member 35 within the elongated chamber 342 during operation.

When loosening the handgrip 23 to rotate the keyway 221 back to the original position (this is known in the prior art), the protruding member 356 is moved back to the right end of the keyway 221 (as shown in FIG. 4). The shifting member 35 and the spring 355 are returned back to their original positions or states.

As mentioned above, the accelerator device of this invention is controlled by the keyway 221 and the protruding member 356. There is no need to use a cable to connect with the electric drive mechanism, thereby facilitating assembly and maintenance of the accelerator device. In addition, by virtue of the cam mechanism of the protruding member 356 and the keyway 221, the accelerator device of this invention operates steadily and experiences minimum break down.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A hand-operated accelerator device for use in an electric-powered bicycle which includes a handlebar, a sprocket wheel and an electric drive mechanism to drive the sprocket wheel, comprising:

a handgrip speed controlling actuator adapted to be sleeved on the handlebar so as to be rotatable thereto, said actuator having a right end handgrip portion and a left end portion with an outer circumferential seat;

a speed controlling signal emitting member including a body which defines an elongated chamber extending in a longitudinal direction, said body having a guiding slot that is opened externally and that extends in said longitudinal direction;

a shifting member slidably received in said elongated chamber and including two magnets disposed to be spaced apart from each other with an accommodating space in said longitudinal direction, and a protruding member extending outwardly of said guiding slot and moving with said shifting member within said guiding slot;

a hall-effect generator disposed to extend transversely into said accommodating space so as to generate a voltage signal when said shifting member is driven to move in said longitudinal direction;

circuit means, connected to said hall-effect generator, for converting said voltage signal into a control signal that is adapted for controlling revolutions of the electric drive mechanism;

means for transmitting a rotatory movement of said outer circumferential seat to said protruding member so as to drive said shifting member to move in said longitudinal direction; and means for biasing said shifting member in said longitudinal direction.

2. The hand-operated accelerator device as claimed in claim 1, wherein said speed controlling signal emitting member is adapted to be mounted on said handlebar in such a manner that said longitudinal direction is parallel to said handlebar.

3. The hand-operated accelerator device as claimed in claim 2, wherein said transmitting means includes a cam surface disposed on said outer circumferential seat to engage slidably said protruding member so as to transmit the rotatory movement of said outer circumferential seat to said protruding member.

4. The hand-operated accelerator device as claimed in claim 3, wherein said cam surface is a keyway provided in said outer circumferential seat and extending in a direction that is inclined relative to said longitudinal direction to receive said protruding member therein.

5. The hand-operated accelerator device as claimed in claim 1, wherein said circuit means includes a circuit board received in said body and connected electrically to said hall-effect generator.

6. The hand-operated accelerator device as claimed in claim 1, wherein said biasing means is a spring mounted in said elongated chamber between said shifting member and an inner wall of said body confining said elongated chamber, said spring extending in said longitudinal direction.

* * * * *